(12) United States Patent
Chen

(10) Patent No.: US 7,256,675 B2
(45) Date of Patent: Aug. 14, 2007

(54) ENERGY TRANSFER APPARATUS FOR REDUCING CONDUCTIVITY ELECTROMAGNETIC INTERFERENCE AND MANUFACTURING METHOD THEREOF

(75) Inventor: Chien-Liang Chen, Jhonghe (TW)

(73) Assignee: System General Corporation, Taipei Hsien (TW)

( * ) Notice: Subject to any disclaimer, the term of this patent is extended or adjusted under 35 U.S.C. 154(b) by 0 days.

(21) Appl. No.: 11/400,336

(22) Filed: Apr. 10, 2006

(65) Prior Publication Data

US 2007/0152794 A1    Jul. 5, 2007

(30) Foreign Application Priority Data

Dec. 30, 2005   (TW) ............................... 94147691 A

(51) Int. Cl.
*H01F 27/28* (2006.01)
(52) U.S. Cl. ................. 336/180; 336/182; 336/84 M
(58) Field of Classification Search ........ 336/180–182, 336/84 M, 212; 323/301, 355; 315/278, 315/282

See application file for complete search history.

(56) References Cited

U.S. PATENT DOCUMENTS

| | | | | |
|---|---|---|---|---|
| 4,089,049 A | * | 5/1978 | Suzuki et al. ................. 363/17 |
| 4,507,721 A | * | 3/1985 | Yamano et al. ................ 363/20 |
| 4,518,941 A | * | 5/1985 | Harada ......................... 336/69 |
| 6,549,431 B2 | | 4/2003 | Odell et al. | |
| 6,762,946 B2 | | 7/2004 | Odell et al. | |
| 6,894,909 B2 | | 5/2005 | Odell et al. | |
| 6,903,642 B2 | * | 6/2005 | Mayfield et al. .............. 336/90 |
| 7,123,121 B2 | * | 10/2006 | Park ......................... 336/84 C |
| 2004/0246749 A1 | | 12/2004 | Odell et al. | |

* cited by examiner

*Primary Examiner*—Anh Mai
(74) *Attorney, Agent, or Firm*—Rosenberg, Klein & Lee

(57) ABSTRACT

An energy transfer apparatus is developed for reducing a conductivity electromagnetic interference and manufacturing method. The energy transfer apparatus comprises a core, an input winding, an output winding, a supply voltage and a supply winding. The supply winding includes a shielding winding and an auxiliary winding. The input winding receives an input voltage for outputting the output voltage through the core and the output winding. The shielding winding and the auxiliary winding generate the supply voltage through the core. By setting of wire size and winding turns of the shielding winding, the conductivity electromagnetic interference is reduced for stabilizing an electric potential between an input-grounding terminal and an output-grounding terminal of the energy transfer apparatus.

13 Claims, 4 Drawing Sheets

ENERGY TRANSFER APPARATUS FOR REDUCING CONDUCTIVITY ELECTROMAGNETIC INTERFERENCE AND MANUFACTURING METHOD THEREOF

BACKGROUND OF THE INVENTION

1. Field of the Invention

The present invention relates to an energy transfer apparatus, and more particularly to an energy transfer apparatus for reducing conductivity electromagnetic interference and a manufacturing method thereof.

2. Description of Related Art

In the PWM technique, much attention is paid to the influence of conductivity electromagnetic interference produced by switching a switch device with a high frequency on electronic devices. In the field of power supply, the conductivity electromagnetic interference can be lowered to meet the requirements of different international safety certifications.

FIG. 1 shows a prior art circuit of a power supply, an input winding $N_P$ of the power supply 1 receives an input voltage $V_{IN}$ through an energy transfer apparatus 10. When a controller $U_1$ controls the switching of a switching device $Q_1$, the input terminal of the power supply 1 transmits the stored energy to an output terminal through a core 103. An output voltage $V_{OUT}$ is generated in an output winding $N_S$ and a supply voltage $V_{DD}$ is produced in a supply winding $N_A$ in response to the turn ratio of an input winding $N_P$ (between Node 8 and Node 10), an output winding $N_S$ (between Node 1 and Node 3), and a supply winding $N_A$ (between Node 7 and Node 5). In the foregoing process of the energy transfer, the input winding $N_P$ and the output winding $N_S$ will produce conductivity electromagnetic interference due to high switching frequency and the effect of a parasitic capacitor 109 between the input winding $N_P$ and the output winding $N_S$.

Referring to FIG. 1, for reducing conductivity electromagnetic interference, the first method of the prior art is to place a shielding capacitor 108 between an input ground terminal of the energy transfer apparatus 10 and an output ground terminal to stabilize both of the electric potential. In practical applications, the shielding capacitor 108 is also known as a capacitor Y. Since the shielding capacitor 108 has a leakage current, the safety is poor and unable to meet the requirements of safety standards. Besides, in the low-power system, the cost is relatively increased for the additional shielding capacitor 108. The second method of the prior art is to place a copper foil having a shielding effect between the input winding $N_P$ and the output winding $N_S$ for reducing conductivity electromagnetic interference, wherein the copper foil is designed in the energy transfer apparatus 10. Referring to FIG. 2 for the cross-sectional view of a prior art energy transfer apparatus. The copper foil 113 is installed between the input winding $N_P$ (between Node 8 and Node 10), the output winding $N_S$ (between Node 1 and Node 3), and the supply winding $N_A$ (between Node 7 and Node 5) to reduce conductivity electromagnetic interference. When the core 103 is connected to a bobbin (not shown in the figure), the volume and space increased by installing the copper foil 113 will break or damage the core 103 and the bobbin easily.

In recent development, various techniques in wound components have been proposed for power converters to reduce a displacement current flow, such as U.S. Pat. No. 6,549,431 (Odell and Park). The disclosed patent installs a cancellation winding and a balancing winding at the input winding and the output winding respectively. The cancellation winding and the balancing winding utilize a copper wire with a smaller volume to substitute the copper foil to achieve the shielding effect and further reduce the conductivity electromagnetic interference. The cancellation winding and the balancing winding in the aforementioned patent must be the additional windings of the energy transfer apparatus, which will cause insufficient winding space. When the core is connected to the bobbin, the core and the bobbin may be cracked or damaged due to the insufficient winding space. In addition, the cancellation winding and the balancing winding also increase the manufacturing cost. U.S. Pat. No. 6,762,946 (Odell and Park) is a continuation patent of the '431 patent, and U.S. Pat. No. 6,894,909 (Odell and Park) is a continuation patent of the '431 patent and the '946 patent. Furthermore, U.S. Patent Publication US20040246749 (Odell and Jutty) provides a method and an apparatus of installing an additional windings for reducing displacement current flow based on the foregoing '431 patent. In addition to the installation of a secondary balancing winding on the output winding, a cancellation winding and a primary balancing winding are installed on the input winding. Such arrangement also installs a copper wire with a smaller volume to substitute the copper foil to achieve the shielding effect. However, installing more additional windings make worse for the problems of the insufficient space and the increased cost.

SUMMARY OF THE INVENTION

In view of the foregoing shortcomings, the present invention provides an energy transfer apparatus and a manufacturing method by setting the wire size and the manufacturing method of the supply winding for reducing conductivity electromagnetic interference without adding a shielding capacitor, a copper foil, and an additional winding. Therefore, it is a primary objective of the present invention to provide an energy transfer apparatus for reducing conductivity electromagnetic interference to be used in a power supply. Meanwhile, the problems of insufficient winding space and increased cost can be solved.

The energy transfer apparatus for reducing conductivity electromagnetic interference for a power supply is coupled to an input voltage for converting and outputting an output voltage. The energy transfer apparatus comprises a core. An input winding wound around the core. An output winding wound around the core, and the output winding is capacitively coupled to the input winding. A supply voltage is coupled to a controller for providing an operating voltage. A shielding winding wound around the core, and the shielding winding is electrically coupled to the input winding and capacitively coupled to the output winding. An electric potential is produced by the capacitive coupling between the shielding winding and the output winding for reducing a potential difference produced between the input winding and the output winding for stabilizing an electric potential between an input-grounding terminal and an output-grounding terminal of the energy transfer apparatus to reduce conductivity electromagnetic interference. An auxiliary winding wound around the core, and the auxiliary winding is electrically coupled to the shielding winding and the input winding and further capacitively coupled to the output winding. The input winding receives the input voltage for outputting the output voltage through the core and the output winding, and outputting the supply voltage through the shielding winding and the auxiliary winding. The output voltage and the supply voltage are produced in proportional to the input voltage respectively.

The manufacturing method of the energy transfer apparatus for reducing conductivity electromagnetic interference comprises: wound an input winding around a core, wound an auxiliary winding around the input winding, and the input winding is close to the core more than the auxiliary winding and installing an insulator between the input winding and the auxiliary winding; wound a shielding winding around the auxiliary winding, and the auxiliary winding is close to the core more than the shielding winding and installing the insulator between the auxiliary winding and the shielding winding; winding an output winding around the shielding winding, and the shielding winding is close to the core more than the output winding and installing the insulator between the shielding winding and the output winding.

To make it easier for our examiner to understand the innovative features and technical content, we use a preferred embodiment together with the attached drawings for the detailed description of the invention, but it should be pointed out that the attached drawings are provided for reference and description but not for limiting the present invention.

DETAILED DESCRIPTION OF THE PREFERRED EMBODIMENTS

Figure 1:
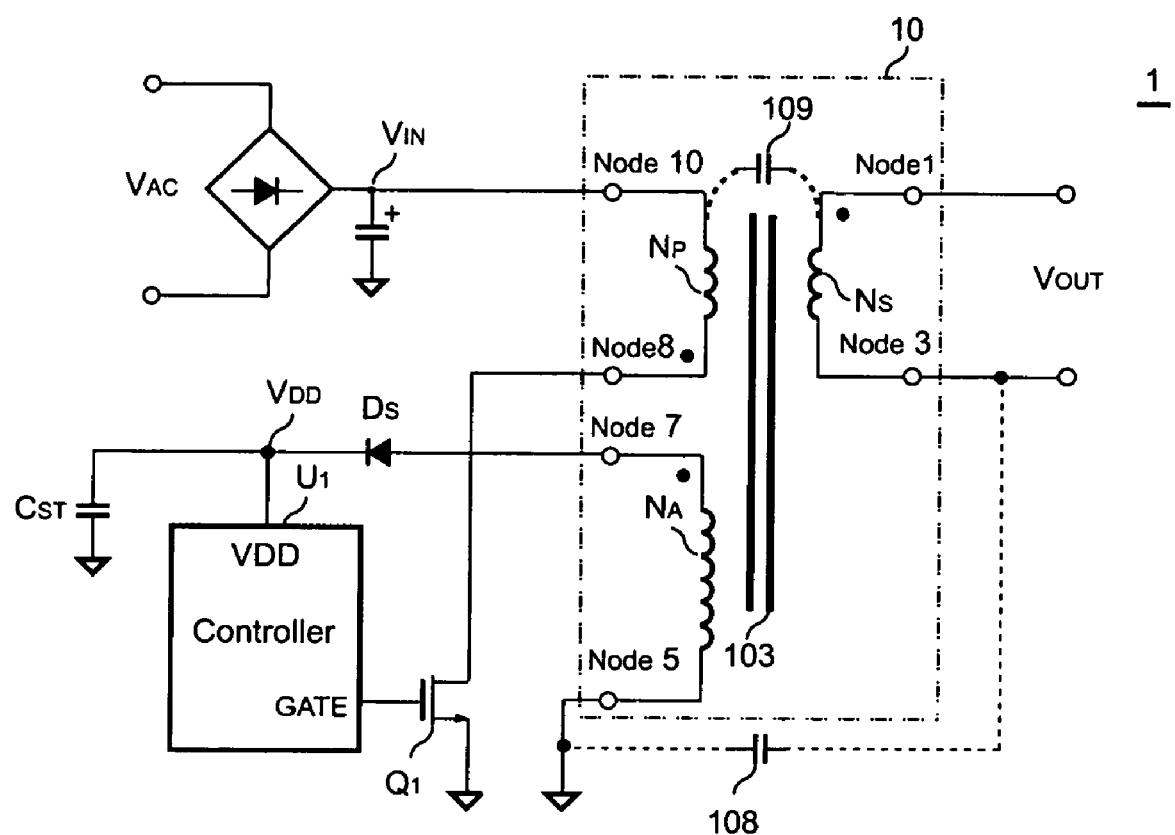
FIG. 1 shows a prior art circuit of a power supply.
Figure 2:
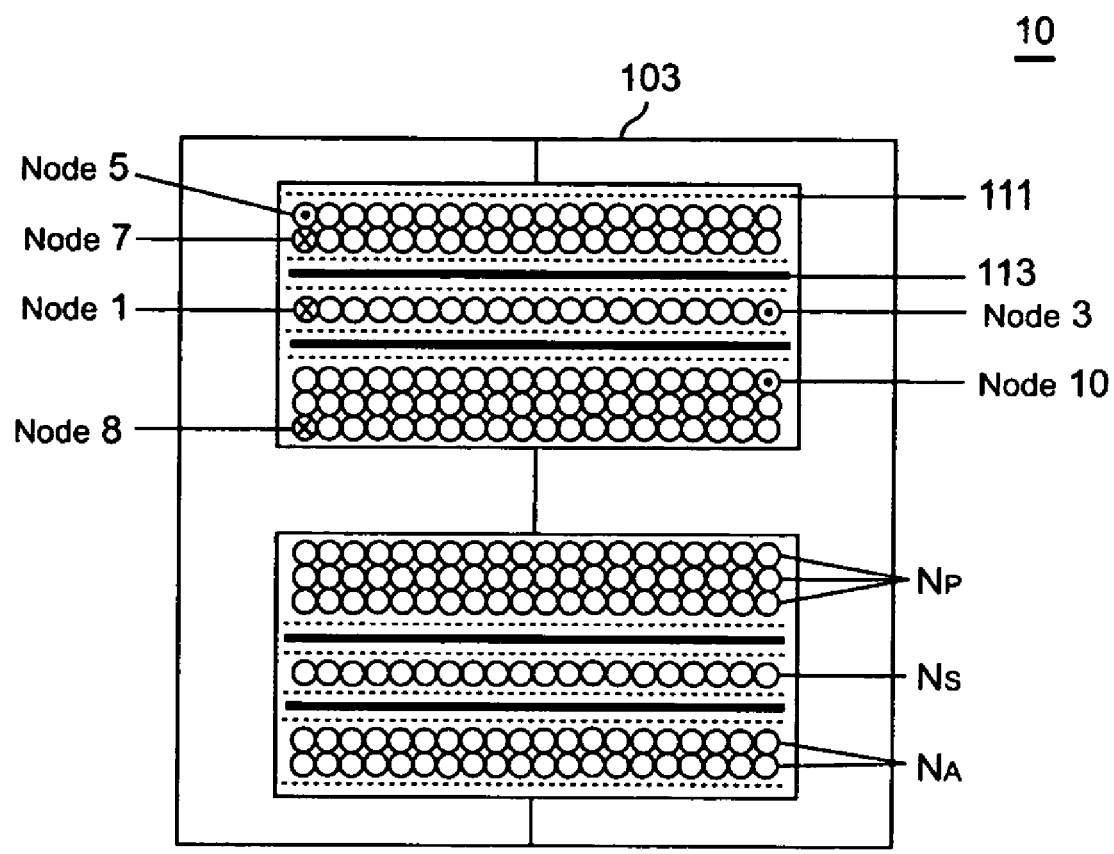
FIG. 2 shows a cross-sectional view of a prior art energy transfer apparatus.
Figure 3:
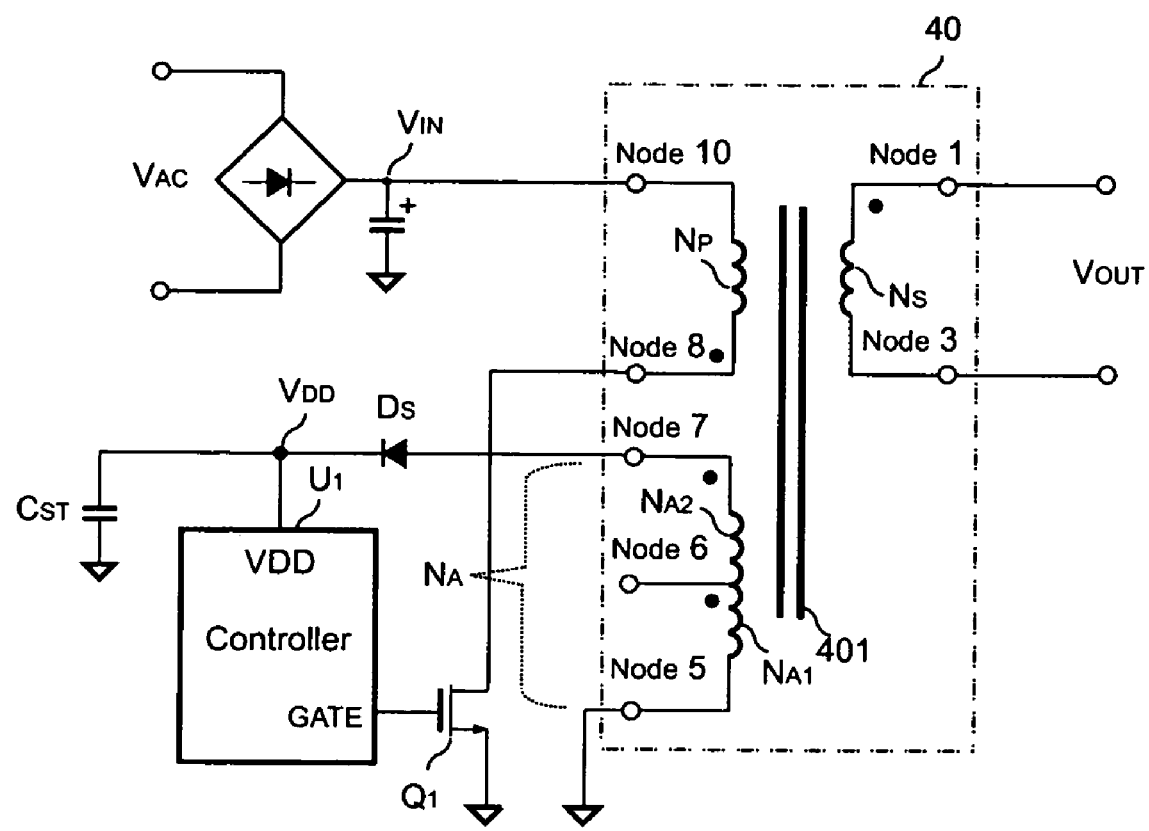
FIG. 3 shows a schematic circuit of an energy transfer apparatus for reducing conductivity electromagnetic interference for a power supply according to the present invention.

FIG. 3 shows the schematic circuit of an energy transfer apparatus for reducing conductivity electromagnetic interference for a power supply according to the present invention. The energy transfer apparatus 40 comprises a core 401. An input winding $N_P$ (between Node 8 and Node 10) wound around the core 401, an output winding $N_S$ (between Node 1 and Node 3) wound around the core 401, and the output winding $N_S$ is capacitively coupled to the input winding $N_P$. A supply voltage $V_{DD}$ is coupled to a controller $U_1$ for providing an operating voltage. A shielding winding $N_{A1}$ (between Node 6 and Node 5) wound around the core 401, and the shielding winding $N_{A1}$ is electrically coupled to the input winding $N_P$ and capacitively coupled to the output winding $N_S$. An electric potential is produced by the capacitive coupling between the shielding winding $N_{A1}$ and the output winding $N_S$ for reducing potential difference between the input winding $N_P$ and the output winding $N_S$ for stabilizing an electric potential between an input-grounding terminal and an output-grounding terminal of the energy transfer apparatus to reduce conductivity electromagnetic interference. An auxiliary winding $N_{A2}$ (between Node 7 and Node 6) wound around the core 401, and the auxiliary winding $N_{A2}$ is electrically coupled to the shielding winding $N_{A1}$ and input winding $N_P$ and further capacitively coupled to the output winding $N_S$.

The input winding $N_P$ receives the input voltage $V_{IN}$ for outputting an output voltage $V_{OUT}$ through the core 401 and the output winding $N_S$, and outputting a supply voltage $V_{DD}$ through a supply winding $N_A$ (between Node 7 and Node 5). The supply winding $N_A$ includes the auxiliary winding $N_{A2}$ and the shielding winding $N_{A1}$. A transformer of a flyback converter is used for illustration, each foregoing winding can be obtained by the following equation (1) and (2):

$$\frac{N_P}{N_S} = \frac{V_{IN}}{V_O} \qquad (1)$$

$$\frac{N_P}{N_A} = \frac{V_{IN}}{V_{DD}} \qquad (2)$$

wherein the $N_P$ is the winding turns of the input winding, which also indicates the input winding. $N_S$ is the winding turns of the output winding, which also indicates the output winding. $N_A$ is the winding turns of the supply winding, which also indicates the supply winding. $V_{IN}$, $V_O$ and $V_{DD}$ are the input voltage, the output voltage, and the supply voltage respectively. The supply winding $N_A$ comprises the shielding winding $N_{A1}$ and the auxiliary winding $N_{A2}$.

The design rule of the shielding winding $N_{A1}$ is to set the winding turns of the shielding winding $N_{A1}$ equal to the output winding $N_S$ in response to the winding turns of the output winding $N_S$, and the space of the bobbin and the magnitude of the output current are further considered in accordance with the actual manufacturing needs. The shielding winding $N_{A1}$ is used for multiple-parallel winding with fully wound on one layer of the bobbin once the wire size of the shielding winding $N_{A1}$ is smaller than the output winding $N_S$. Another design rule of the foregoing shielding winding $N_{A1}$ is to set the difference in winding turns between the shielding winding $N_{A1}$ and the output winding $N_S$ is one turn, and the space of the bobbin and the magnitude of the output current are further considered in accordance with the actual manufacturing needs. The shielding winding $N_{A1}$ is used for multiple-parallel winding with fully wound on one layer of the bobbin once the wire size of the shielding winding $N_{A1}$ is smaller than the output winding $N_S$. The winding turns of the shielding winding $N_{A1}$ and the output winding $N_S$ are used for multiple-parallel winding with fully wound on one layer of the bobbin respectively. In other words, when the bobbin is coupled to the core 401, the height occupied by the winding turns above the bobbin can be greatly decreased to effectively reduce the problem of insufficient space and damages as the wire size of the shielding winding $N_{A1}$ is smaller than the output winding $N_S$.

The ratio of sum of the winding turns of the shielding winding $N_{A1}$ and the auxiliary winding $N_{A2}$ to the winding turns of the output winding $N_S$ is equal to the ratio of the supply voltage $V_{DD}$ to the output voltage $V_O$. In other words, the sum of winding turns of the shielding winding $N_{A1}$ and the auxiliary winding $N_{A2}$ is equal to the winding turns of the supply winding $N_A$. In addition, the winding phases of the shielding winding $N_{A1}$ and the auxiliary winding $N_{A2}$ are the same as the winding phase of the output winding $N_S$. The wire size and the winding turns of the auxiliary winding $N_{A2}$, the output winding $N_S$, and the input winding $N_P$ are selected to be the same as those of a prior art, and thus will not be described here.

The input winding $N_P$ is coupled to the input voltage $V_{IN}$ for outputting the output voltage $V_{OUT}$ through the core 401 and the output winding $N_S$, and outputting the supply voltage $V_{DD}$ through the shielding winding $N_{A1}$ and the auxiliary winding $N_{A2}$. The output voltage $V_{OUT}$ and the supply voltage $V_{DD}$ are produced in proportional to the input voltage $V_{IN}$ respectively. Since the sum of the winding turns of the shielding winding $N_{A1}$ and the auxiliary winding $N_{A2}$ is equal to the supply winding $N_A$, so that the output power of the shielding winding $N_{A1}$ and the auxiliary winding $N_{A2}$ can be used as an operating voltage required for the controller $U_1$.

Figure 4:
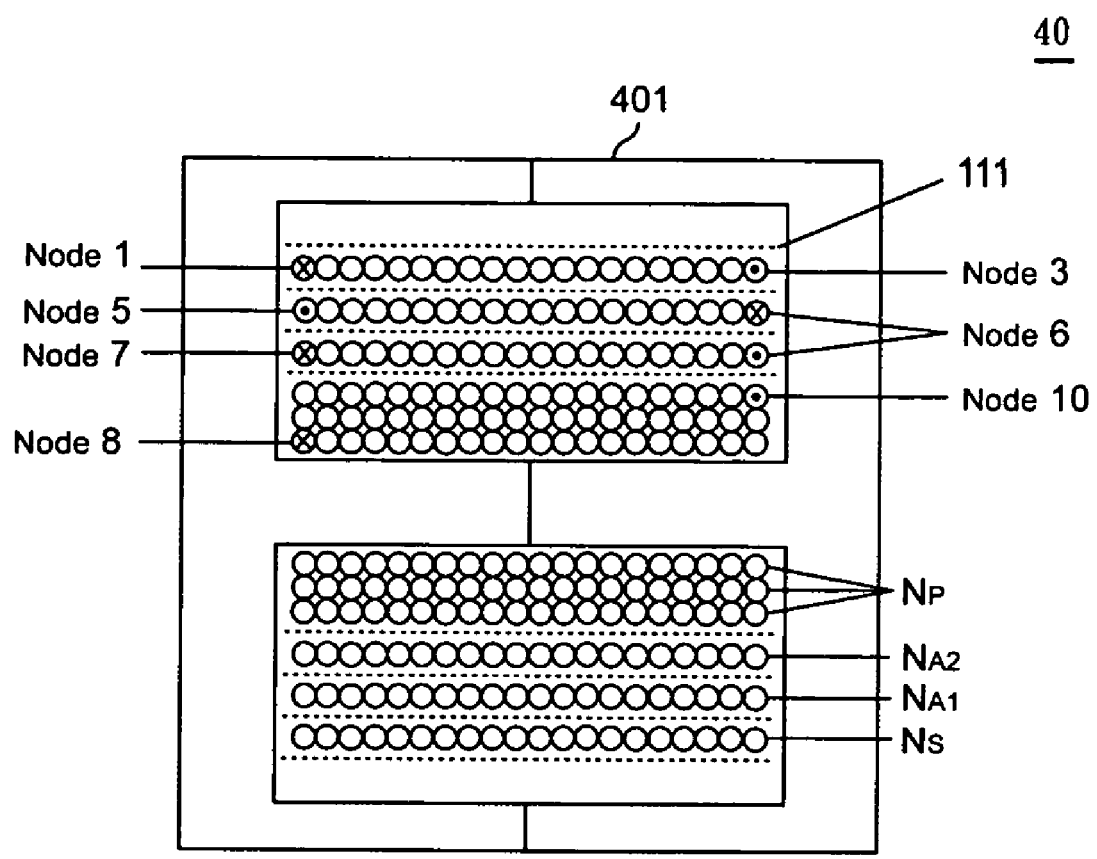
FIG. 4 shows a cross-sectional view of an energy transfer apparatus for reducing electromagnetic interference according to the present invention.

Referring to FIG. 4 for the cross-sectional view of the energy transfer apparatus for reducing conductivity electromagnetic interference according to the present invention, each winding uses the bobbin (not shown in the figure) as the center to sequentially wind the input winding $N_P$, the auxiliary winding $N_{A2}$, the shielding winding $N_{A1}$, and the output winding $N_S$ and then connects the core 401, such that each winding is wound around the core 401, wherein a tape 111 is used for separating each winding.

The relations between each winding and the core 401 are as follows: The input winding $N_P$ is close to the core 401 more than the auxiliary winding $N_{A2}$, the shielding winding $N_{A1}$, and the output winding $N_S$, the auxiliary winding $N_{A2}$ is close to the core 401 more than the shielding winding $N_{A1}$ and the output winding $N_S$, the shielding winding $N_{A1}$ is close to the core 401 more than the output winding $N_S$. The coupling relations of each winding are as follows: The output winding $N_S$ is capacitively coupled to the input winding $N_P$, the shielding winding $N_{A1}$ and the auxiliary winding $N_{A2}$ are capacitively coupled to the output winding $N_S$, the auxiliary winding $N_{A2}$ is electrically coupled to the shielding winding $N_{A1}$, the shielding winding $N_{A1}$ and the auxiliary winding $N_{A2}$ are electrically coupled to the input winding $N_P$.

The present invention sets the same winding turns for the shielding winding $N_{A1}$ and the output winding $N_S$. Through the electric potential produced by the capacitive coupling between the shielding winding $N_{A1}$ and the output winding $N_S$, the potential difference between the input winding $N_P$ and the output winding $N_S$ is reduced for stabilizing the electric potential between the input-grounding terminal and the output-grounding terminal of the energy transfer apparatus to minimize conductivity electromagnetic interference. The energy transfer apparatus of the present invention is used in a power supply, which can be installed in a transformer of a forward converter or a flyback converter.

The manufacturing method of the energy transfer apparatus for reducing conductivity electromagnetic interference sequentially winds an input winding $N_P$, an auxiliary winding $N_{A2}$, a shielding winding $N_{A1}$, and an output winding $N_S$ around a core 401. The manufacturing method comprises the steps of wound an input winding $N_P$ around a core 401, wound an auxiliary winding $N_{A2}$ around the input winding $N_P$, the input winding $N_P$ is close to the core 401 more than the auxiliary winding $N_{A2}$, and installing an insulator between the input winding $N_P$ and the auxiliary winding $N_{A2}$, wound a shielding winding $N_{A1}$ around the auxiliary winding $N_{A2}$, the auxiliary winding $N_{A2}$ is close to the core 401 more than the shielding winding $N_{A1}$, and installing an insulator between the auxiliary winding $N_{A2}$ and the shielding winding $N_{A1}$, wound an output winding $N_S$ around the shielding winding $N_{A1}$, the shielding winding $N_{A1}$ is close to the core 401 more than the output winding $N_S$, and installing the insulator between the shielding winding $N_{A1}$ and the output winding $N_S$.

The relations between each winding and the core 401 are as follows: The input winding $N_P$ is closed to the core 401 more than the auxiliary winding $N_{A2}$, the shielding winding $N_{A1}$, and the output winding $N_S$, the auxiliary winding $N_{A2}$ is close to the core 401 than the shielding winding $N_{A1}$ and the output winding $N_S$, and the shielding winding $N_{A1}$ is close to the core 401 more than the output winding $N_S$. The coupling relations of each winding are as follows: the output winding $N_S$ is capacitively coupled to the input winding $N_P$, the shielding winding $N_{A1}$ and the auxiliary winding $N_{A2}$ are capacitively coupled to the output winding $N_S$, the auxiliary winding $N_{A2}$ is electrically coupled to the shielding winding $N_{A1}$, and the shielding winding $N_{A1}$ and the auxiliary winding $N_{A2}$ are electrically coupled to the input winding $N_P$.

The present invention provides an energy transfer apparatus for reducing conductivity electromagnetic interference and manufacturing method thereof without adding a shielding capacitor, a copper foil, and an additional winding. By setting the wire size and the manufacturing method of the supply winding, the conductivity electromagnetic interference can be reduced effectively and the problems of insufficient winding space and increased cost can be solved.

Although the present invention has been described with reference to the preferred embodiments thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An energy transfer apparatus for reducing a conductivity electromagnetic interference for a power supply, connected to an input voltage for outputting an output voltage, comprising:

a core;

an input winding, wound around the core;

an output winding, wound around the core, the output winding capacitively coupled to the input winding;

a supply voltage, coupled to a controller for providing an operating voltage;

a shielding winding, wound around the core, the shielding winding electrically coupled to the input winding and capacitively coupled to the output winding, and an electric potential produced by a capacitive coupling between the shielding winding and the output winding for reducing a potential difference between the input winding and the output winding for stabilizing an electric potential between an input-grounding terminal and an output-grounding terminal of the energy transfer apparatus to reduce the conductivity electromagnetic interference; and an auxiliary winding, wound around the core, the auxiliary winding electrically coupled to the shielding winding and the input winding and further capacitively coupled to the output winding;

wherein the input winding receives the input voltage for outputting the output voltage through the core and the output winding, and outputting the supply voltage through the shielding winding and the auxiliary winding, the output voltage and the supply voltage are produced in proportional to the input voltage respectively.

2. The energy transfer apparatus as claimed in claim 1, wherein a ratio of sum of the winding turns of the shielding winding and the auxiliary winding to the winding turns of the output winding is equal to a ratio of the supply voltage to the output voltage.

3. The energy transfer apparatus as claimed in claim 1, wherein the winding turns of the shielding winding are fully wound on one layer of a bobbin.

4. The energy transfer apparatus as claimed in claim 1, wherein the winding turns of the shielding winding is equal to the output winding, the shielding winding is used for multiple-parallel winding with fully wound on one layer of a bobbin once the wire size of the shielding winding is smaller than the output winding.

5. The energy transfer apparatus as claimed in claim 1, wherein the difference in winding turns between the shielding winding and the output winding is one turn, the shielding winding is used for multiple-parallel winding and fully wound on one layer of a bobbin once the wire size of the shielding winding is smaller than the output winding.

6. The energy transfer apparatus as claimed in claim 1, wherein the winding phase of the shielding winding and the auxiliary winding are equal to the output winding.

7. The energy transfer apparatus as claimed in claim 1, wherein the input winding is close to the core more than the auxiliary winding, the shielding winding and the output winding; the auxiliary winding is close to the core more than the shielding winding and the output winding; the shielding winding is close to the core more than the output winding.

8. A manufacturing method of the energy transfer apparatus, comprising:
   wound an input winding around a core;
   wound an auxiliary winding around the input winding, the input winding being close to the core more than the auxiliary winding, and installing an insulator between the input winding and the auxiliary winding;
   wound a shielding winding around the auxiliary winding, the auxiliary winding being close to the core more than the shielding winding, and installing the insulator between the auxiliary winding and the shielding winding; and
   wound an output winding around the shielding winding, the shielding winding being close to the core more than the output winding, and installing the insulator between the shielding winding and the output winding.

9. The manufacturing method of the energy transfer apparatus as claimed in claim 8, wherein a ratio of sum of the winding turns of the shielding winding and the auxiliary winding to the winding turns of the output winding is equal to a ratio of a supply voltage to an output voltage.

10. The manufacturing method of the energy transfer apparatus as claimed in claim 8, wherein the winding turns of the shielding winding and the output winding fully wound on one layer of a bobbin respectively.

11. The manufacturing method of the energy transfer apparatus as claimed in claim 8, wherein the shielding winding is equal to the output winding in the winding turns, the shielding winding is used for multiple-parallel winding and fully wound on one layer of a bobbin once the wire size of the shielding winding is smaller then the output winding.

12. The method of manufacturing the energy transfer apparatus as claimed in claim 8, wherein the difference in winding turns between the shielding winding and the output winding is one turn, the shielding winding is used for multiple-parallel winding and fully wound on one layer of a bobbin once the wire size of the shielding winding is smaller than the output winding.

13. The method of manufacturing the energy transfer apparatus as claimed in claim 8, wherein the winding phase of the shielding winding and the auxiliary winding are equal to the output winding.

* * * * *